US007607015B2

(12) United States Patent
Fascenda

(10) Patent No.: US 7,607,015 B2
(45) Date of Patent: Oct. 20, 2009

(54) SHARED NETWORK ACCESS USING DIFFERENT ACCESS KEYS

(75) Inventor: Anthony C. Fascenda, North Bethesda, MD (US)

(73) Assignee: Koolspan, Inc., Bethesda, MD (US)

( * ) Notice: Subject to any disclaimer, the term of this patent is extended or adjusted under 35 U.S.C. 154(b) by 557 days.

(21) Appl. No.: 10/679,268

(22) Filed: Oct. 7, 2003

(65) Prior Publication Data

US 2004/0068653 A1 Apr. 8, 2004

Related U.S. Application Data

(60) Provisional application No. 60/416,583, filed on Oct. 8, 2002, provisional application No. 60/422,474, filed on Oct. 31, 2002, provisional application No. 60/477,921, filed on Jun. 13, 2003.

(51) Int. Cl.
*H04L 9/00* (2006.01)
(52) U.S. Cl. ................ 713/171; 713/168; 709/229
(58) Field of Classification Search ........... 713/155, 713/168, 171; 709/203, 229
See application file for complete search history.

(56) References Cited

U.S. PATENT DOCUMENTS

| | | | |
|---|---|---|---|
| 5,661,806 A * | 8/1997 | Nevoux et al. ............ 380/247 |
| 5,768,382 A | 6/1998 | Schneier et al. |
| 6,304,658 B1 | 10/2001 | Kocher et al. |
| 6,526,264 B2 | 2/2003 | Sugar et al. |
| 6,571,221 B1 | 5/2003 | Stewart et al. |
| 6,611,821 B2 | 8/2003 | Stahl et al. |
| 6,643,781 B1 | 11/2003 | Merriam |
| 6,657,981 B1 | 12/2003 | Lee et al. |
| 6,980,660 B1 * | 12/2005 | Hind et al. ............... 380/282 |
| 7,028,186 B1 * | 4/2006 | Stenman et al. ............ 713/173 |
| 2001/0023446 A1 * | 9/2001 | Balogh ...................... 709/229 |
| 2001/0048744 A1 * | 12/2001 | Kimura ...................... 380/247 |
| 2002/0021665 A1 | 2/2002 | Bhagavath et al. |
| 2002/0129143 A1 | 9/2002 | McKinnon, III et al. |
| 2002/0157090 A1 | 10/2002 | Anton, Jr. |
| 2002/0169712 A1 | 11/2002 | Ginzboorg et al. |

(Continued)

OTHER PUBLICATIONS

Menezes et al, "Handbook of Applied Cryptography" book, Jun. 2001, CRC press, 5th edition, p. 508.*

(Continued)

*Primary Examiner*—Gilberto Barron, Jr.
*Assistant Examiner*—Hadi Armouche
(74) *Attorney, Agent, or Firm*—Hunton & Williams LLP

(57) ABSTRACT

A system and method for consistent authentication and security mechanism to enable a client device to easily roam from one network to another without requiring the client to manually change network configurations is disclosed. In one embodiment, a client device listens for a "beacon frame" broadcast from a Wi-Fi access point. The beacon frame identifies the basic service set identifier (BSSID) of the access point. A tamper-resistant token, or client key, installed at the client device stores a set of authentication parameters, e.g., cryptographic keys, for each Wi-Fi network the client is permitted to access. Each set of authentication parameters is associated with a particular BSSID. Using the BSSID received from the access point, the client device identifies and implements the appropriate set of authentication parameters necessary to authenticate the client device according to an authentication process generally accepted by all the Wi-Fi networks potentially servicing the client.

17 Claims, 13 Drawing Sheets

U.S. PATENT DOCUMENTS

| | | | |
|---|---|---|---|
| 2003/0041244 A1 | 2/2003 | Buttyan et al. | |
| 2003/0051140 A1 | 3/2003 | Buddhikot et al. | |
| 2003/0061363 A1* | 3/2003 | Bahl et al. | 709/229 |
| 2003/0093680 A1 | 5/2003 | Astley et al. | |
| 2003/0095663 A1* | 5/2003 | Nelson et al. | 380/270 |
| 2004/0023639 A1 | 2/2004 | Noel, Jr. | |
| 2004/0153553 A1* | 8/2004 | Chotkowski et al. | 709/229 |
| 2004/0198220 A1* | 10/2004 | Whelan et al. | 455/41.1 |

OTHER PUBLICATIONS

Bruce Potter, "Wireless Security's Future," On the Horizon, IEEE 2003, pp. 68-72.

John Cox, "Vendors Offer Tools To Control, Secure WLANs," Network World, Jun. 7, 2004; 21, 23; ABI/INFORM Global, p. 24.

Miguel Bravo-Escos, "Networking Get Personal," IEEE Review, Jan. 2002, pp. 32-36.

International Search Report dated Dec. 6, 2004 for Application No. PCT/US03/31930.

* cited by examiner

Authentication Request Frame sent to AP 922

| Authentication Algorithm Number | Authentication Transaction Seq. Number | Status Code | Challenge Text | CRC |
|---|---|---|---|---|
| "3" | "1" | 0 | Client key serial number, [R1] random number encrypted with $CK\_IDS_{2C}$ | |

FIG. 9B

Authentication Response Frame returned to Client 924

| Authentication Algorithm Number | Authentication Transaction Seq. Number | Status Code | Challenge Text | CRC |
|---|---|---|---|---|
| "3" | "2" | 0 | [R2] encrypted with $CK\_IDS_{2C}$ | |

FIG. 9C

SHARED NETWORK ACCESS USING DIFFERENT ACCESS KEYS

CROSS-REFERENCE TO RELATED APPLICATIONS

This present application claims priority to U.S. Provisional Patent Application No. 60/416,583 filed on Oct. 8, 2002; U.S. Provisional Patent Application No. 60/422,474 filed Oct. 31, 2002; and U.S. Provisional Patent Application No. 60/477,921 filed Jun. 13, 2003. The contents of these three provisionals are incorporated herein by reference in their entirety. The present application is related to U.S. patent application Ser. No. 10/679,472, entitled "Self-Managed Network Access Using Localized Access Management," and U.S. patent application Ser No. 10/679,371 entitled "Localized Network Authentication and Security Using Tamper-Resistant Keys," both of which are filed concurrently herewith.

BACKGROUND OF THE INVENTION

1. Field of Invention

The present invention relates to wireless networking, and more particularly, to an authentication and secure communication system for Wi-Fi (IEEE 802.11) networks.

2. Description of Related Art

A Wireless Local Area Network (WLAN) is generally implemented to provide local connectivity between a wired network and a mobile computing device. In a typical wireless network, all of the computing devices within the network broadcast their information to one another using radio frequency (RF) communications. WLANs are based on the Institute of Electrical and Electronic Engineers (IEEE) 802.11 standard, which designates a wireless-Ethernet specification using a variety of modulation techniques at frequencies generally in the 2.4 gigahertz (GHz) and 5 GHz license-free frequency bands.

The IEEE 802.11 standard ("Wi-Fi"), the disclosure of which is incorporated herein in its entirety by reference, enables wireless communications with throughput rates up to 54 Mbps. Wi-Fi (for "wireless fidelity") is essentially a seal of approval certifying that a manufacturer's product is compliant with IEEE 802.11. For example, equipment carrying the "Wi-Fi" logo is certified to be interoperable with other Wi-Fi certified equipment. There are Wi-Fi compatible PC cards that operate in peer-to-peer mode, but Wi-Fi usually incorporates at least one access point, or edge device. Most access points have an integrated Ethernet controller to connect to an existing wired-Ethernet network. A Wi-Fi wireless transceiver connects users via the access point to the rest of the LAN. The majority of Wi-Fi wireless transceivers available are in Personal Computer Memory Card International Association (PCMCIA) card form, particularly for laptop, palmtop, and other portable computers, however Wi-Fi transceivers can be implemented through an Industry Standard Architecture (ISA) slot or Peripheral Component Interconnect (PCI) slot in a desktop computer, a Universal Serial Bus (USB), or can be fully integrated within a handheld device.

FIG. 1 illustrates a typical conventional Wi-Fi network 100. Particularly, Wi-Fi network 100 comprises a number (N) of computing devices 110A-N and an access point 120. Each computing device 110 comprises a Wi-Fi transceiver (not shown) such as a Wi-Fi enabled network interface card (NIC) to communicate with the access point via an RF communications link 115. The access point 120 comprises a Wi-Fi transceiver (not shown) to communicate with a wired network via an RF communications link 125.

Authentication and security features offered by conventional Wi-Fi products have been implemented via Wired Equivalency Protocol (WEP). With WEP enabled, an access point will not admit anyone onto the LAN without the proper WEP settings. The WEP settings are used primarily for wireless security, but they also form the basis for authentication in that without these settings known to and used by the user, the user cannot connect through the access point.

The 802.11 standard defines different frame types that the Wi-Fi enabled NICs and access points employ for communications, as well as managing and controlling the wireless link. Every frame includes a control field that describes the 802.11 protocol version, frame type, and other network indicators, such as whether WEP is active, power management is enabled, etc. All frames contain MAC addresses of the source and destination station, and access point, in addition to a frame sequence number, a frame body, and a frame check sequence for error detection. Data frames carry protocols and data from higher layers within the frame body. For example, a data frame can comprise hypertext markup language (HTML) code from a Web page that a user is viewing. Other frames implemented for management and control carry specific information regarding the wireless link in the frame body. For example, an access point periodically sends a beacon frame to announce its presence and relay information, such as timestamp, service set identifier (SSID), and other parameters regarding the access point to the NICs that are within range.

The SSID is a 32-character unique identifier that acts as a password when a mobile device tries to connect to the network. The SSID differentiates one WLAN from another, so all access points and all devices attempting to connect to a specific WLAN must use the same SSID. A device will not be permitted to join the network unless it can provide the unique SSID. Because an SSID can be sniffed in plain text from a packet it does not supply any security to the network. An SSID is also referred to as a network name, or network ID, because essentially it is a name that identifies a wireless network.

The number of publicly available wireless 802.11 networks is rapidly increasing. Each network is "Wi-Fi compatible" and, following the specification, identifies itself using the beacon frame, which broadcasts the SSID to all potential users of the network. Typically, an access point broadcasts a beacon frame every 10 ms. When a user is in the broadcast range of one or more Wi-Fi networks, the user's wireless NIC listens for the beacon frame(s) associated each network. A list of all SSIDs currently available is displayed to the user, from which the user makes a choice. Typically, there is only one network with which the user can connect. Once a particular available Wi-Fi network is selected, the user must ensure that all of his Wi-Fi communication settings, e.g., SSID, WEP on or off, WEP keys, etc., are properly configured to connect to the selected Wi-Fi network. Use of beacon frames to identify a network is known as "passive mode." An alternative method of seeking wireless networks is known as "active mode," whereby the NIC issues a "probe request" to cause all the listening access points within range to respond with an identifying frame containing their SSID. Both modes are explicitly defined in the 802.11 specification.

As the user moves from network to network, for instance from his office network to a public network at a coffee shop, the user must switch his Wi-Fi setting as appropriate for the local network. Generally, this requires advanced knowledge of the settings for the new network. MICROSOFT WINDOWS® operating systems facilitate the storage of these settings as a "location," thereby enabling the user to simply point-and-click to select the new network. However, the user still must manually install these parameters for the new network during initial setup.

As the number of networks proliferates, the number of network configurations will become daunting. Moreover, each network authenticates the user in some fashion. Some networks are left in "wide-open" mode where only a proper SSID selected is necessary to connect, but most others require passwords, WEP keys, etc.

Of further difficulty for a host facility of a Wi-Fi network such as an airport, generally there can only be one Wi-Fi network hosted per location. For example, Wi-Fi networks are shared-used networks. That is, Wi-Fi networks are unlicensed and hence there is no protection against interference from an additional network being installed at the same location. Once the first network is installed, say a WAYPORT®. network, which provides travelers with wireless Internet access, no other network can be installed without interference resulting from the second network. The host facility generally prefers that all potential customers have access to the wireless network, not just WAYPORT customers. However, a WAYPORT network only admits WAYPORT customers. Therefore, the issue becomes how do you allow a private network to admit customers from other networks to utilize the private network.

Companies like BOINGO™. offer a service whereby users can roam across multiple networks without necessarily being a customer of any particular network. BOINGO employs a 'sniffer' program which listens to the beacon frames and looks for a match in it's database of known network configurations. When a match is found, the BOINGO software will automatically make the appropriate configuration changes for that network and allow the user to connect. Once connection is attempted, the user appears to the network as a BOINGO customer and the user's credentials are passed onto an authentication server for the network. On recognition of the user's name at the authentication server, for example, access is then granted or denied. If the BOINGO customer is not really a customer of the present network, the authentication server forwards the user's credentials to a BOINGO authentication server, which performs the authentication service and if valid, passes the 'grant' command back to the original network authentication server. One problem with this approach is that as the number of 'network affiliates' grows for BOINGO, each network's configuration must be stored in a database. Accordingly, information in this database must be downloaded to each user. This becomes difficult to manage as the number of users and networks increase.

"Hot-Spots" as Wi-Fi networks are known in the public space, allow users portable, high-speed access to networks. Current Hot-Spot networks are designed such that only their authorized users can access their network. The configuration of each network includes numerous parameters, particularly if security such as WEP is enabled. As Hot-Spot networks are typically unlicensed and must share the spectrum with other users, the existence of a network generally precludes the construction of a second network for other users at the same location. The authentication mechanism for one network can be entirely different from that of another network. Each network may further have different settings for security.

SUMMARY OF THE INVENTION

The present invention overcomes these and other deficiencies of the related art by providing a method to make network roaming simple and automatic without requiring any back-end authentication servers and alleviating the need to handle large numbers of network parameters.

It is the object of this invention to provide a secure, local, edge-method of authenticating users using pre-stored credentials in the user's device rather than an authentication server. It is a second object of this invention to allow the user's device to automatically detect which among many possible network configurations to select when connecting to a network.

The present invention features three principal elements: one or more Wi-Fi access points each with a pre-configured tamper-resistant token, or AP key, comprising a serial number and secret cryptographic keys; one or more client tokens, or client keys, each of which is pre-configured to authenticate the client for multiple Wi-Fi networks, i.e., access points; and an administration facility comprising a software program capable of registering and configuring both the AP and the client keys.

When a client device enters the transmission range of an access point, the client device listens for a "beacon frame" broadcast from the access point. The beacon frame identifies the basic service set identifier (BSSID) of the access point. The client key installed at the client device stores a set of authentication parameters, e.g., cryptographic keys, for each Wi-Fi network the client is given permission to use. Each set of authentication parameters is associated with a particular BSSID. Using the BSSID received from the access point, the client device identifies and implements the appropriate set of authentication parameters necessary to authenticate the client device. If the access point does not broadcast beacon frames, the client device can send a "Probe Request," which causes the access point to respond with a beacon frame identifying the access point. In order for a client device to have access to more than one Wi-Fi network, that client device must possess a client key initialized by each Wi-Fi network administrator with the appropriate authentication parameters, or credentials, stored in the client key.

In an embodiment of the invention, a method of authenticating a computing device on a Wi-Fi communications network comprises the steps of: obtaining an access point identifier at a computing device, wherein the access point identifier identifies an access point of a Wi-Fi communications network; selecting, at the computing device, a set of authentication parameters associated with said access point identifier; and implementing an authentication process employing the set of authentication parameters. The access point identifier can be a basic service set identifier received from the access point. The set of authentication parameters are pre-stored in a tamper-resistant physical token installed at the computing device. The tamper-resistant physical token comprises multiple sets of authentication parameters, each of which is associated with a unique access point identifier. The computing device is permitted to access the Wi-Fi communications network via the access point if the authentication process results in a successful authentication of the computing device.

In another embodiment of the invention, a communications system comprises: one or more authentication devices and one or more client devices, wherein each client device includes a unique tamper-resistant physical token comprising: one or more unique sets of authentication parameters, wherein each set of authentication parameters is associated with at least one authentication device; a random number generator; and a unique serial number. Each client device further includes a wireless communications transceiver to communicate with one of the authentication devices via a IEEE 802.11 wireless channel. The authentication devices can be Wi-Fi access points, wherein at least two of which are associated with different Wi-Fi networks. Each of the unique sets of authentication parameters is associated with an access point identifier, which can be a basic service set identifier. Each tamper-resistant physical token is adapted to be installed via a USB interface at the computing device.

The present invention provides at each computing client device a tamper-resistant physical token that holds the credentials, i.e., authentication parameters, for multiple networks. Accordingly, a consistent authentication and security mechanism is provided to enable a client device to easily roam from one network to another without having to manually change network configurations.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the following descriptions taken in connection with the accompanying drawings in which:

FIGS. 9B-C illustrate an exemplary format of the authentication frames exchanged in the embodiment of FIG. 9A;

DETAILED DESCRIPTION OF THE PREFERRED EMBODIMENTS

Figure 1:
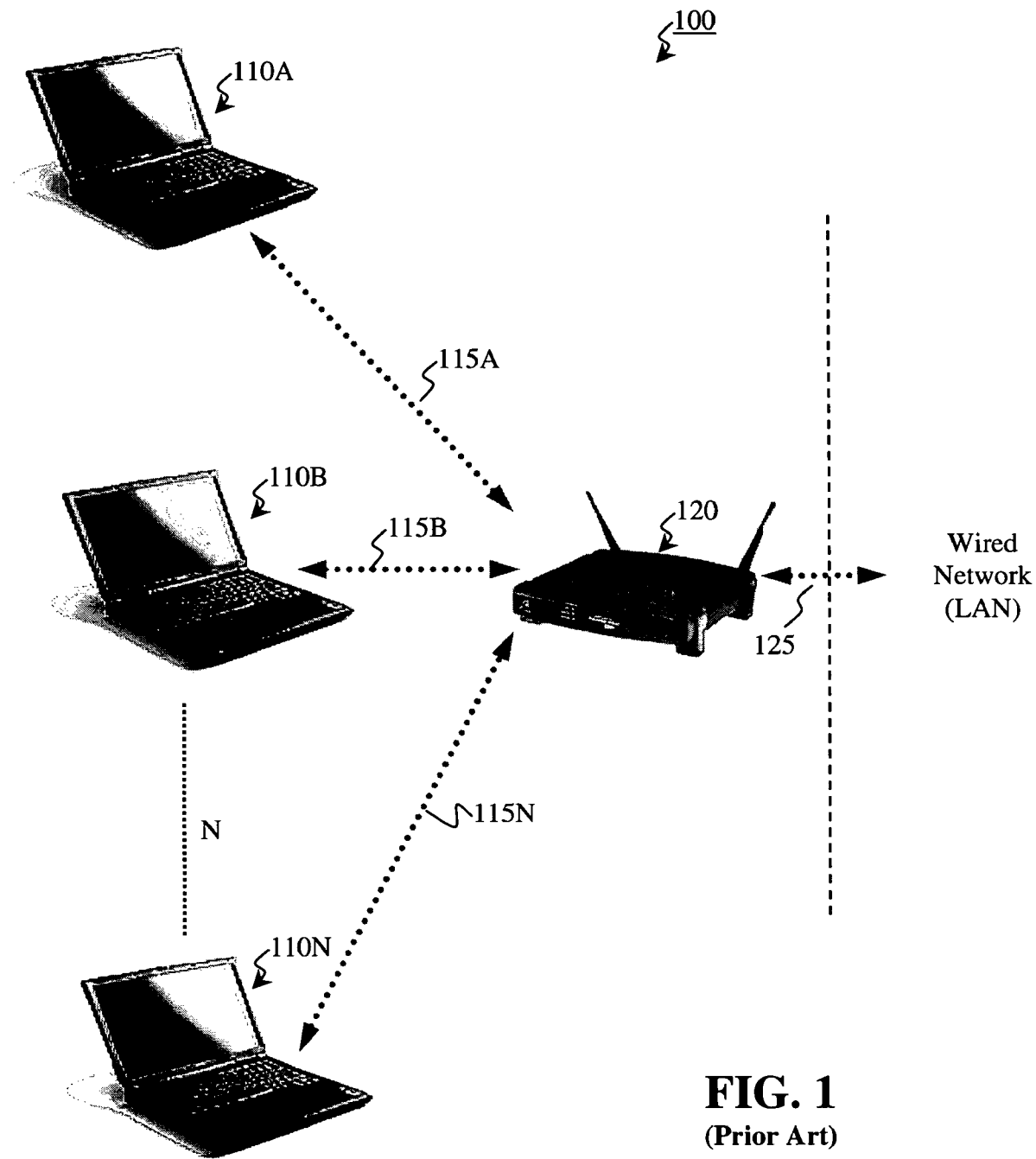
FIG. 1 illustrates a conventional Wi-Fi network.

Preferred embodiments of the present invention and their advantages may be understood by referring to FIGS. 2-11, wherein like reference numerals refer to like elements, and are described in the context of a Wi-Fi network. Nevertheless, the present invention is applicable to both wired or wireless communication networks in general. For example, the present invention enables secure end-to-end access between a client and any computer residing on a network backbone. Often there may not be a wireless component anywhere in such a situation.

The present invention implements a secure, local, edge method and system (the implementation of which is herein referred to as communicating in a "secure" mode) employing a combination of software routines and physical keys in the form of easy-to-use adapters that attach to existing computing devices and wireless access points via an available USB port. These physical keys are secure, tamper-resistant physical tokens. "Edge" refers to authentication of client devices taking place at the edge or outer boundary of the network, i.e., at the access point, rather than centralized within the network using a server. Client computing devices are authenticated and data security is provided across wireless links using secret cryptographic keys, which are pre-stored in the physical keys installed at both the client's computing device and the access point. According to an embodiment of the invention, special access point software ("AP software") is provided in the wireless access points and NIC drivers are provided in the client devices to realize the functions described herein and to ensure delivery of standard Wi-Fi functionality as well as compatibility with all Wi-Fi certified products currently installed on a Wi-Fi network.

Figure 2:
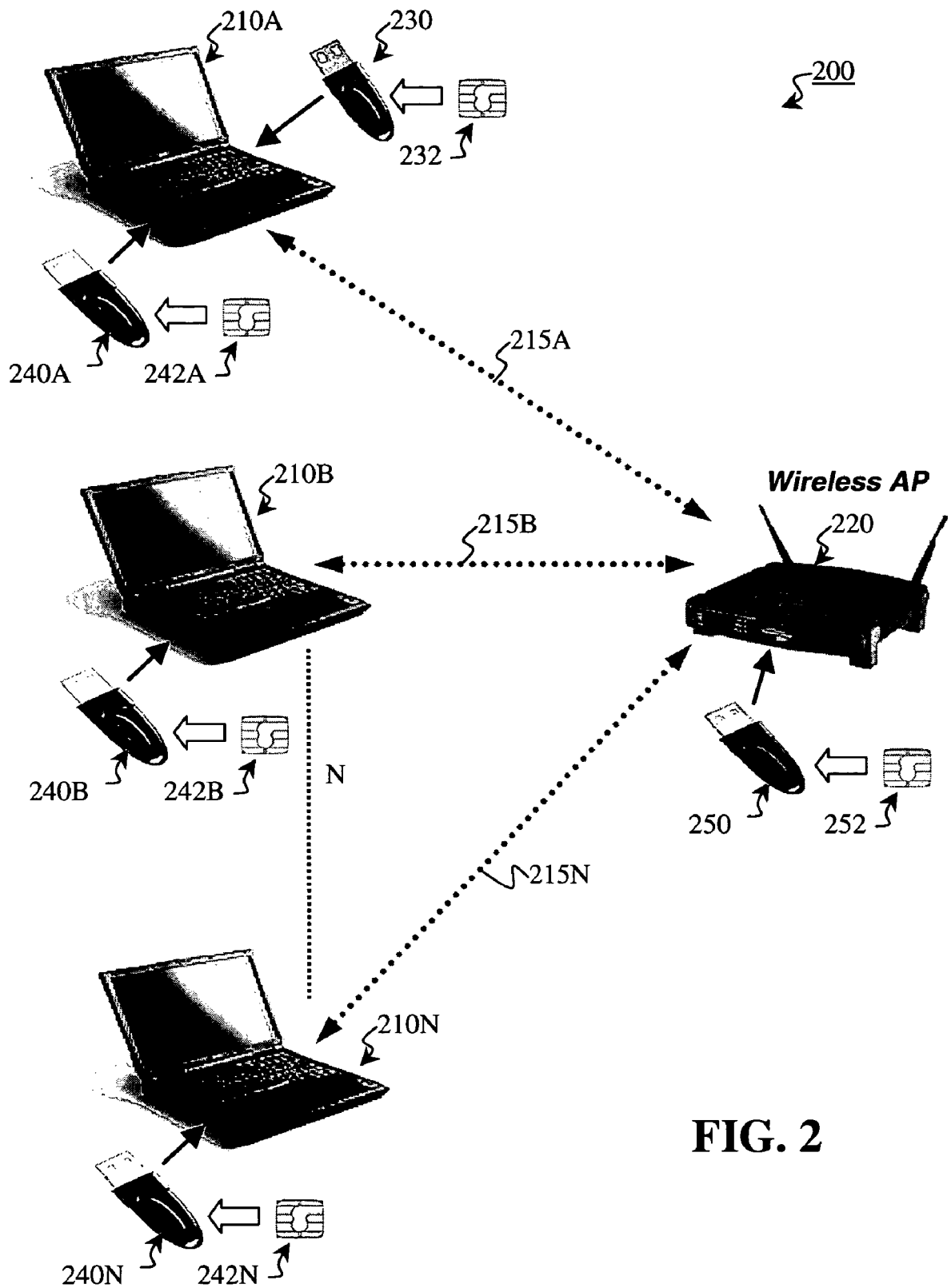
FIG. 2 illustrates a secure Wi-Fi communication system according to an embodiment of the invention.

FIG. 2 illustrates a secure Wi-Fi network 200 according to an embodiment of the invention. Wi-Fi network 200 comprises a number N of computing devices 210A-N communicating with one another via a wireless access point 220. The access point 220 comprises a Wi-Fi transceiver (not shown) to communicate with a wired network (not shown). Although each computing device 210 is shown as a laptop, other Wi-Fi enabled computing devices such as, but not limited to personal digital assistants (PDAs), desktops, and workstations can be employed within network 200. Moreover, one of ordinary skill in the art recognizes that more than one wireless access point 220 may be implemented within network 200. All computing devices 210A-N can act as clients of network 200. However, at least one computing device such as computing device 210A is reserved as a host computer for administering the inventive features through residing administrative software (not shown) when necessary. In an alternative embodiment, the host computer can be another machine on the wired-side of the network. A master key 230 is installed into an available USB port (not shown) at host computing device 210A during administration and management of the network 200. To facilitate authentication and secure communications, a unique client key 240A-N is installed into an available USB port (not shown) at each computing device 210A-N. Likewise, an access point key ("AP key") 250 is installed into an available USB port (not shown) at access point 220.

It is important to note that the physical keys described herein are implemented via USB ports. One of ordinary skill in the art recognizes that the master key 230, client keys 240A-N, and AP key 250 can be alternatively implemented by other conventional or foreseeable connection configurations such as, but not limited to PC cards installed via a PCI or ISA slot; a physical token connected via a serial, parallel, or other preferred type of port; an Ethernet card; or a wireless smart card. In yet another implementation, the AP key 250 can be incorporated directly into the internal hardware of the access point 220, thereby alleviating the need for an external physical AP key.

The master key 230, client keys 240A-N, and AP key 250 overlap in functionality. Particularly, each physical key comprises an embedded tamper-resistant subscriber identity module (SIM) token 232, 242A-N, or 252, respectively, unique to each key. In an embodiment of the invention, a CRYPTOFLEX™ USB-enabled SIM chip is employed as the SIM token. Nevertheless, other conventional or foreseeable SIMs may be substituted. The AP key 250 differs slightly from both the master key 230 and the client keys 240A-N in that it preferably employs a device USB connector rather than a standard USB connector. Generally, a device USB connector is different from a standard USB connector only in physical layout. Yet, they each carry the same signal wires to provide a USB interface to the USB-enabled SIM chip, which typically communicates over a simplex data line at approximately 9600 bits-per-second. Importantly, each physical key has a unique serial number stored permanently and electronically inside the SIM by the manufacturer to provide positive identification. Each SIM comprises a random number generator.

Each client key 240 is used to authenticate and provide secure connections at a corresponding computing device 210. Once the special NIC driver software is installed for a NIC, the computing device 210 examines whether a Wi-Fi network exists and if found, attempts to authenticate itself with that network. If the network is enabled to operate in secure mode, all of the currently configured wireless settings of the computing device 210 are switched to secure mode and the login process is completely automated as further described. If the network is not secure mode enabled, the computing device 210 attempts to connect to it using standard Wi-Fi parameters. The smart NIC driver replaces a standard driver associated via a standard wireless NIC card, thereby providing the software necessary to manage communications with the client key 240. This driver authenticates data packets and performs encryption/decryption functions during secure mode communications.

Like the master key 230, the AP key 250 is first initialized so that it can be recognized by the administrative software and by the AP software as an AP key. The AP key 250 is used to activate functionality in access point 220. In an embodiment of the invention, the access point 220 does not function without the AP key 250 installed. Removal of the AP key 250 causes all associated network connections to be immediately broken and further wireless access through the access point 220 is not possible until the AP key 250 is reinserted. In an alternative embodiment, the access point 220 defaults to standard mode if the AP key 250 is not inserted. If the AP key 250 is inserted, for instance, the access point 220 facilitates the secure mode for properly enabled users, but also provides limited standard Wi-Fi communications for users not properly enabled to use the secure mode. If more than one access point is present within the network, each access point has its own unique AP key.

The master key 230, while identical in physical design to the client keys 240A-N and the AP key 250, performs additional functionality. Particularly, the master key 230 is used by an administrator to manage a key database (not shown), which will be described in detail below, and the set of client keys 240A-N and AP key 250. The master key 230 is required to operate the administrative software and is used to initialize all client and AP keys. As described below, the master key 230 is initialized after receipt from the manufacturer to identify itself electronically to the administrative software as a master key. Preferably, there is one master key 230 per network 200, although duplicate master keys can be cloned for backup. When installed into a host computer running the administrative software, the master key 230 enables either the creation of or unlocking of the key database. As an optional extra security measure, the master key 230 must be unlocked with an appropriate PIN stored inside the key to become active. If the master key 230 is lost, access to this database and hence maintenance of the network 200 is irretrievably lost.

Figure 3:
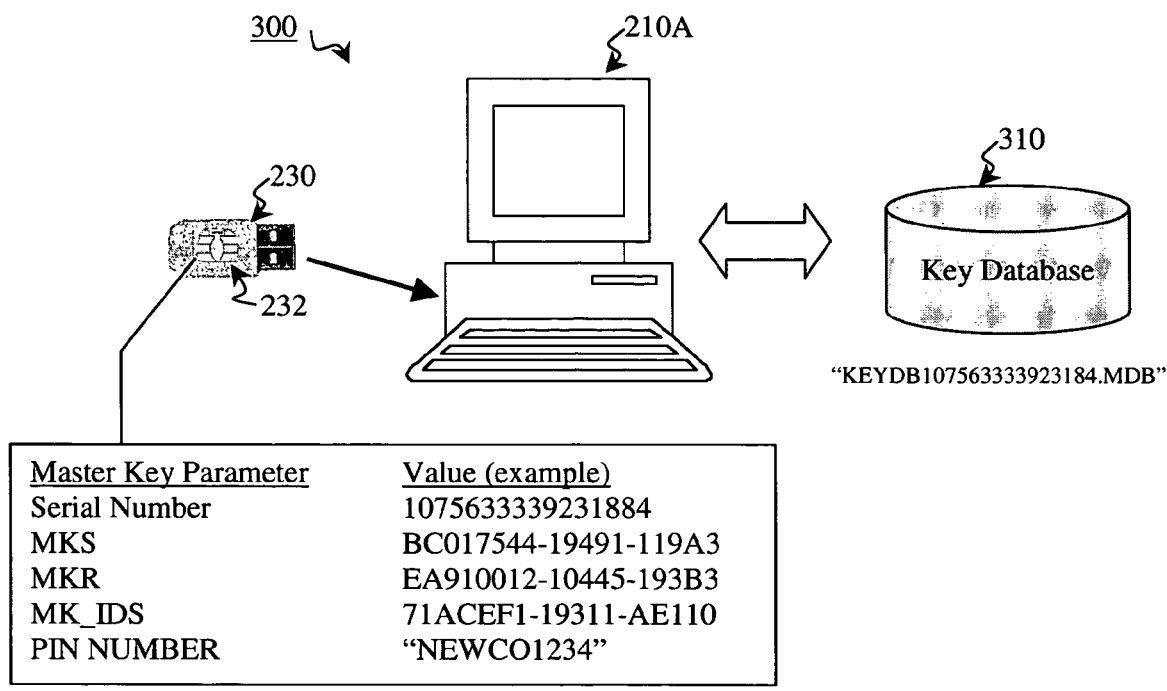
FIG. 3 illustrates a key management system according to an embodiment of the invention.

FIG. 3 illustrates a key management system 300 according to an embodiment of the invention. Particularly, the key management system 300 comprises the host computing device 210A, the master key 230, and a key database 310. The master key 230 comprises a serial number, a master key network cryptographic send key ("MKS"), a master key network cryptographic receive key ("MKR"), a master key cryptographic secret key ("MK_IDS"), and a PIN number. As will be described, MKS, MKR, and MK_IDS, example values of which are presented in hexadecimal form in the figure, are created upon initialization of the master key. MK_IDS has no mathematical relationship to the master key serial number. Use of the cryptographic keys will be described in further detail below. As previously mentioned, the PIN number is used to unlock the master key 230, i.e., to access the data stored on SIM 232, and hence to access the key database 310. The key database 310, which is securely stored within a memory device of host computer 210A, comprises individual records of every client key 240A-N and AP key 250 initialized for use within network 200. Each individual client key record comprises a serial number of the corresponding client key and information such as name of person or computing device that the client key belongs to, location, company department, and any other administrative fields deemed necessary. Each individual client key record is stored in encrypted form using the MK_IDS. Key database 310 is referenced by the serial number of the corresponding master key 310 and further comprises the identification of all active AP keys 250 on the network 200 and any pertinent administrative information.

All encryption/decryption tasks described herein are preferably performed using an Advanced Encryption Standard (AES) algorithm, the implementation of which is apparent to one of ordinary skill in the art. Nonetheless, alternative cryptographic algorithms may be employed, the identification and implementation of which are also apparent to one of ordinary skill in the art.

Figure 4:
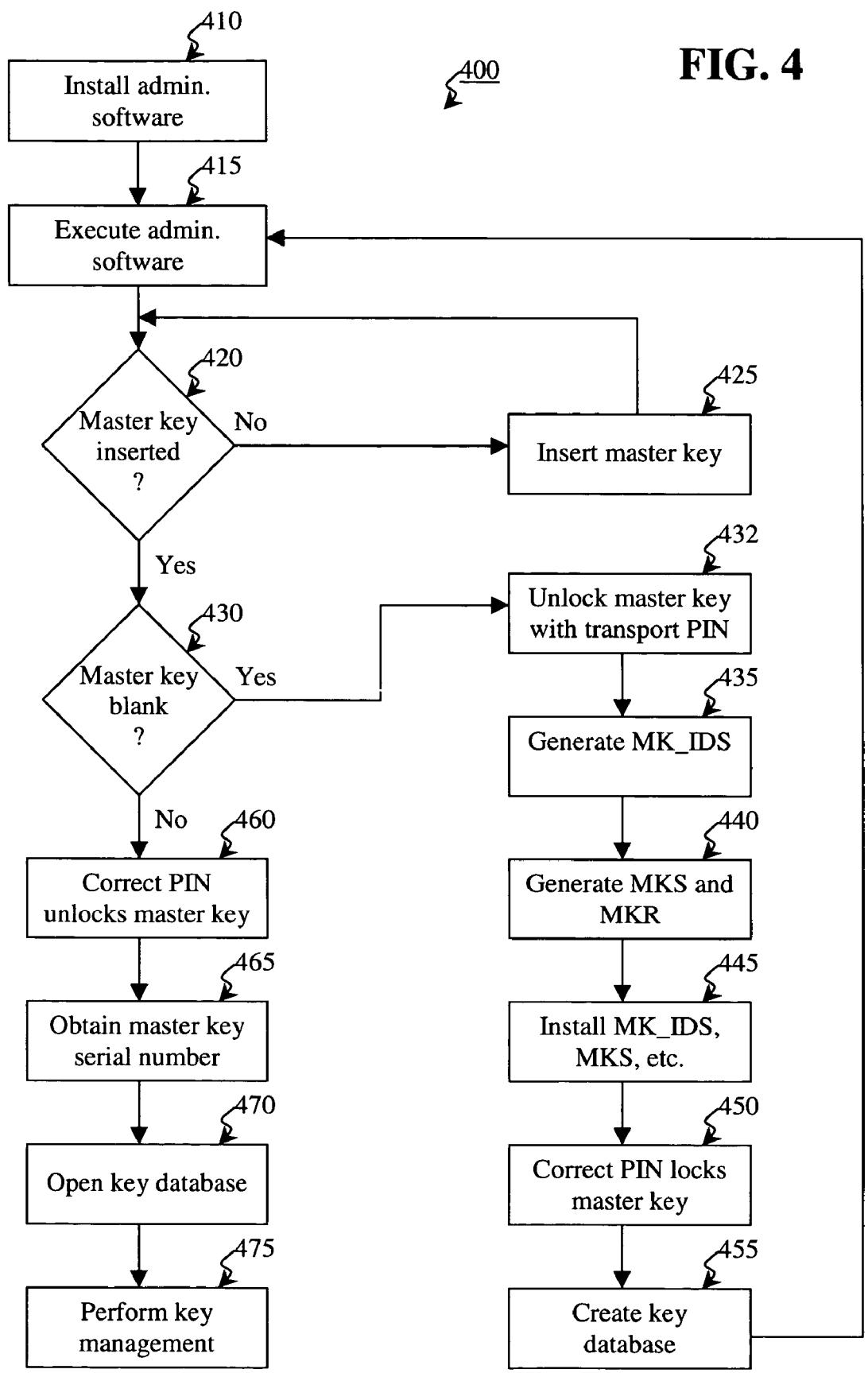
FIG. 4 illustrates a master key management process according to an embodiment of the invention.

FIG. 4 illustrates a master key management process 400 according to an embodiment of the invention for initializing the master key 230 and administering the key database 310. The administrative software is first installed (step 410) onto host computing device 210A from a CD-ROM or other suitable storage medium. Upon execution (step 415), the administrative software determines (step 420) whether a master key 230 is inserted into an available USB port. If no master key 230 is present, the administrator is directed to insert (step 425) a master key. Once a master key 230 is inserted, it is analyzed to determine (step 430) whether the master key 230 has been previously and properly initialized, or is currently blank, i.e., MKS, MKR, and MK_IDS have not been created and stored within SIM 232. If the master key 230 is blank, it is first unlocked (step 432) with entry of a correct transport PIN or code. For example, a new master key 230 may be delivered with a transport code that an administrator must correctly enter to gain access to the SIM 232. After unlocking the master key 230, the administrator may replace the transport code with a secret code or PIN selected by the administrator for securing the card. Thus, nobody else can utilize the master key 230 without knowing the secret code.

The administrative software creates (step 435) a MK_IDS using a random number generator within the SIM 232. MK_IDS has no mathematical relationship to the master key serial number. Secret network cryptographic keys MKS and MKR, which are respectively the send and receive network cryptographic keys common to all users on the network, are then generated (step 440). For example, the administrative software instructs the SIM 232 to generate three random numbers that become the MKS, MKR, and MK_IDS. MK_IDS, MKS, and MKR, in addition to any administrative information, are then installed (step 445) into SIM 232 of the master key 230. In an embodiment of the invention, MKS, MKR, and MK_IDS are 256-bit random numbers generated by SIM 232. The administrator is requested (step 450) to enter a correct PIN to lock the master key 230, thereby completing initialization. The administrator is now allowed to create (step 455) a new key database 310 and have it associated with the master key 230 through the master key serial number.

If the master key 230 inserted is not blank, i.e., it has already been properly initialized for either the current network 200 or another secure mode enabled network, the administrator is requested (step 460) to enter the correct PIN to unlock the master key 230 and gain access to the key database 310. Upon the entry of a correct PIN, the serial number from the master key is retrieved (step 465) to identify and open (step 470) the appropriate key database 310 stored on host computer 210A. Individual client records within the key database 310 are decrypted with MK_IDS as necessary and key management (step 475), i.e., management of client keys 240A-N and/or AP key 250, is enabled.

In an embodiment of the invention, removal of the master key 230 while the administrative software executes automatically closes the key database 310, thereby rendering the client records not viewable, and disabling all administrative and key management functions. Later insertion of a master key with the administrative software still executing again enables the administrative and key management functions. If execution of the administrative software terminates with the master key 230 inserted, the key database 310 is automatically and securely closed.

Figure 5A:
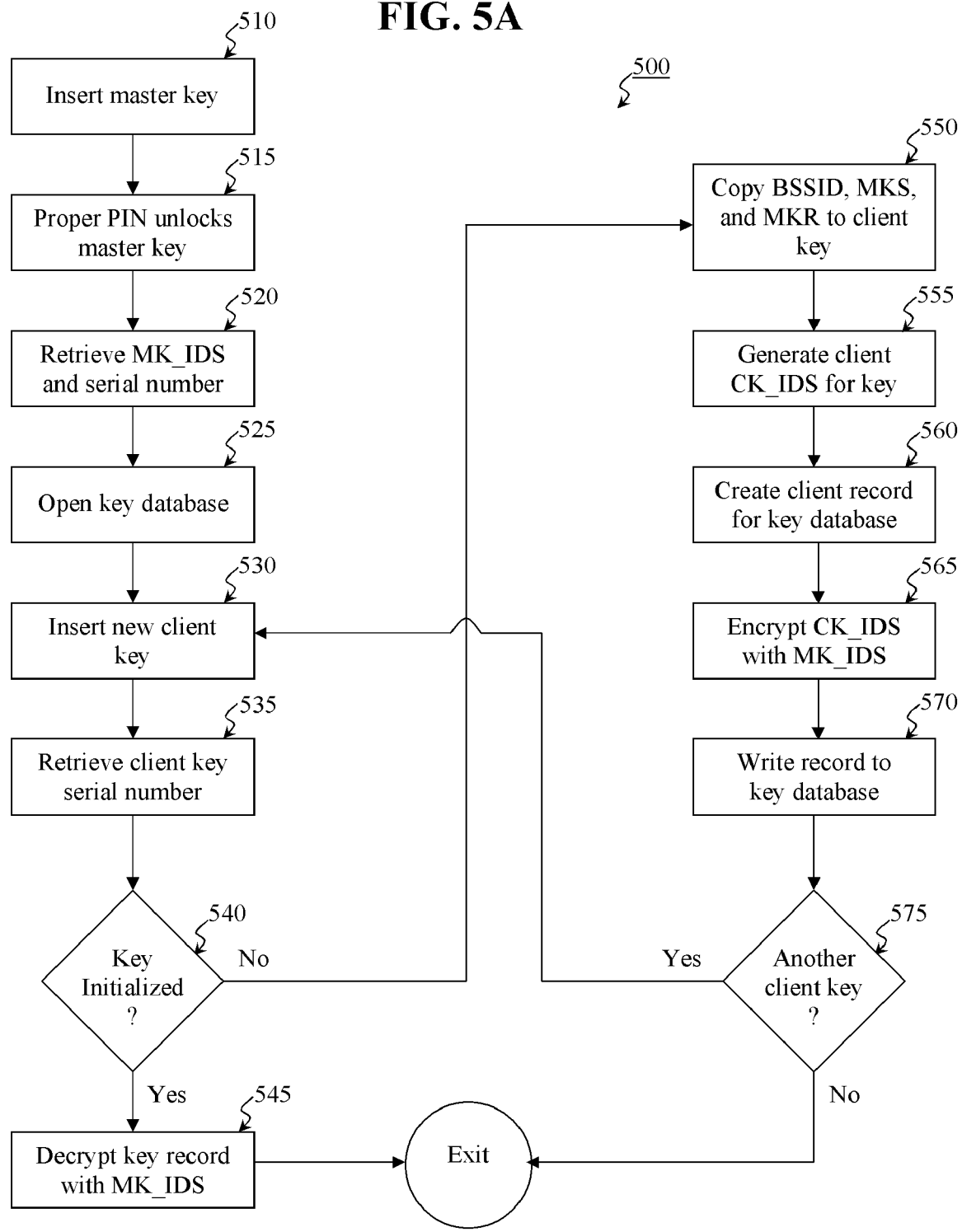
FIG. 5A illustrates a process for generating a key database according to an embodiment of the invention.

FIG. 5A illustrates a process 500 for generating a key database 310 according to an embodiment of the invention. Host computing device 210A must have a minimum of two free USB ports, one for the master key 230 and one for each sequential client key 240 added to the key database 310. A properly initialized master key 230 is first inserted (step 510) into host computing device 210A. To gain access to the data stored within the master key 230, and hence the key database 310 on host computer 210A, a correct PIN associated with the master key 230 must be entered (step 515) by an administrator to activate the key. The administrative software then retrieves (step 520) MK_IDS and the master key serial number. The master key serial number is used to identify and open (step 525) the corresponding key database 310. A client key 240 is inserted (step 530) into the host computer 210A and the administrative software retrieves (step 535) the serial number associated with that client key. The administrative software determines (step 540) if the client key 240 has been previously initialized by identifying whether a corresponding client record exists within the key database 310. If so, the administrative software allows the administrator to view the administrative information associated with the client key 240 by decrypting (step 545) the corresponding key record with MK_IDS. If the client key 240 has not been initialized for use with the present network, cryptographic keys MKS and MKR stored within the master key 230 are copied (step 550) to SIM 242. MKS and MKR become the client's cryptographic network send (NKS) and receive (NKR) keys respectively, i.e., MKS is identical to NKS and MKR is identical to NKR for that network.

In an embodiment of the invention, the basic service set identifier (BSSID), or AP MAC address, associated with a particular access point 220 is installed (step 550) into the client key 240 and associated with the copies of MKS and MKR, i.e., NKS and NKR. If two or more access points 220 are present on one Wi-Fi network, the BSSIDs of all or a portion of the access points 220 can be installed and associated with the NKS and NKR present in client key 240 for that network. In a related embodiment, the SSID of the network can be installed in the client key 240 and associated with the NKS and NKR copied at step 550. As will be discussed further, upon a client device 210 first entering the communication range of a Wi-Fi network 200 and attempting to authenticate with a particular access point 220, the BSSID and/or SSID can be used to retrieve the appropriate and necessary NKS and NKR cryptographic keys stored within the client key 240 and associated with that network, and hence associated with that access point 220.

A client key cryptographic secret key ("CK_IDS") is then generated (step 555) having no mathematical relationship to the client key serial number. For example, SIM 232 is instructed to generate a new 256-bit random number for each new client key 240. A simple SIM command will cause the SIM 232 to generate the number that can be read from the SIM 232 into the host computer 210A and then transferred to the client key 240. A client key record is created (step 560) comprising administrative information pertaining to the user or computing device associated with the client key 240, the serial number of the client key 240, and CK_IDS encrypted (step 565) with MK_IDS. This client key record is then stored (step 570) in the key database 310. The administrator then has the option of initializing another client key (step 575), wherein steps 530-570 are repeated for each additional client key 240.

Figure 5B:
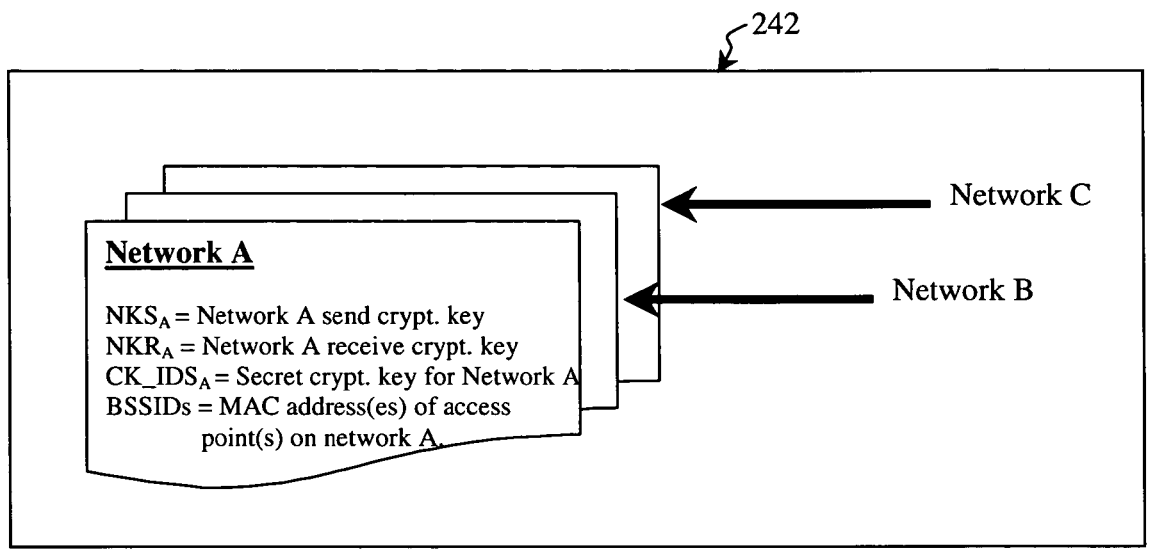
FIG. 5B illustrates a client key initialized for multiple Wi-Fi networks according to an embodiment of the invention.

In an embodiment of the invention, a client key 240 can be initialized for multiple secure mode enabled networks. Particularly, SIM 242 can comprise a set of parameters for each network (or for individual access points) for which it has been granted permission. Each network requires the user to have a set of cryptographic network send and receive keys, and a cryptographic secret key pertaining to that network. An exemplary scenario is illustrated in FIG. 5B, wherein a client key 240 is initialized for three networks A, B, and C. SIM 242 comprises an appropriate cryptographic network send and receive keys, and a cryptographic secret key for respective networks A, B, and C. In the example shown, these cryptographic keys are listed as $NKS_A$, $NKR_A$, and $CK\_UIDS_A$ for network A. The cryptographic keys for networks B and C (not shown) could be similarly designated. The $NKS_A$ and $NKR_A$ employed at the client key are mirror images of the cryptographic keys employed in the access point of the corresponding network. For example, when the access point of network A sends a packet encrypted with $NKS_A$, the client employs $NKR_A$ to decrypt the packet. The key factor here is that to gain access to a new network, the administrator of that network has to install the cryptographic keys NKS and NKR for that network in the user's physical token, which is preferably performed via the local physical connection process as described herein in order to prevent the cryptographic keys from being transferred over an outside communications link. In a less preferred embodiment, a secure remote transfer process is implemented to transfer an encrypted communication comprising NKS and NKR to the client device by using the client SIM's on-chip ability to perform cryptographic communications, the implementation of which is apparent to one of ordinary skill in the art. In a related embodiment of the invention, the BSSID of one or more access points on a particular network is associated with that network's cryptographic keys NKS, NKR, and CK_IDS stored within the SIM 242. In another related embodiment of the invention, the SSID of the network is associated with that network's cryptographic keys NKS, NKR, and CK_IDS stored within the SIM 242.

In an embodiment of the invention, all secure mode enabled networks are set to appear as "wide-open." That is, the SSID of all secure mode enabled networks is set to an identical identifier and WEP is turned OFF. These settings ensure that regardless of the particular secure mode enabled network to which the user connects, the settings are identical. As will become apparent from the following the description, even though the secure mode enabled network appears to all potential users to be wide open, a user can connect to that network without having the proper respective network cryptographic keys NKS and NKR. The authentication process discriminates between those users who have valid cryptographic keys and those who do not, thus blocking access to only legitimate users and denying access to all others. The client's cryptographic secret key for that network ensures that all communications are securely encrypted.

Figure 6:
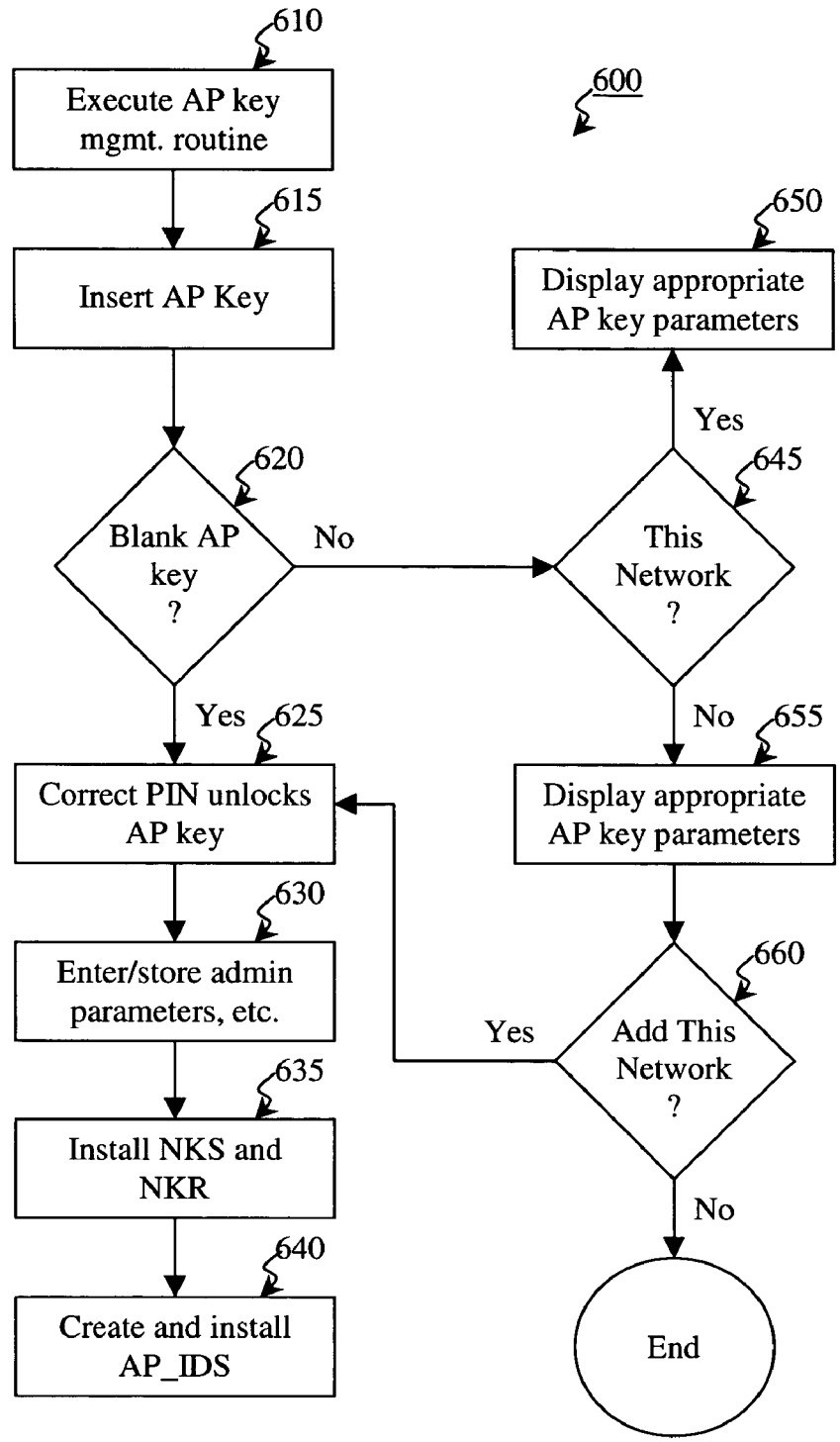
FIG. 6 illustrates a process for managing an access point key according to an embodiment of the invention.

Key management of the AP key 250 is performed according to the process 600 illustrated in FIG. 6. Host computing device 210A must have a minimum of two free USB ports, one for the master key 230 and one for the AP key 250. Upon execution (step 610) of an appropriate AP key management subroutine within the administrative software, the administrator is requested (step 615) to insert an AP key 250 into an available USB port. Upon insertion of an AP key, the subroutine checks (step 620) whether the inserted AP key is blank, i.e., not initialized, or is an existing key belonging to network 200 or another secure mode enabled Wi-Fi network. If the AP key 250 is blank, the administrator is required (step 625) to enter a correct PIN to unlock the key. Of course, failure to enter the correct PIN in a certain number of attempts may optionally disable key management functions for a set period of time.

Once unlocked, the administrator enters (step 630) one or more administration parameters appropriate to the access point 220 such as network identification, location, access point identification, etc. In an embodiment of the invention, the network identification is the SSID of the appropriate network and the access point identifier is its BSSID. This information is stored within key database 310 and/or SIM 252 of the AP key 250. NKS and NKR are then installed (step 635) into SIM 252 by copying the values of MKR and MKS respectively. An access point cryptographic secret key ("AP_IDS") is then created (step 640) from a random 256-bit number generated by SIM 232 and installed in the AP key 250. AP_IDS is encrypted with the MK_IDS and subsequently stored with the AP serial number as an access point record in the key database 310.

It is important to note that the NKS of the AP key 250 must match the NKR of the client keys 240A-N for a particular network. Likewise, the NKR of the AP key 250 must match the NKS of the client keys 240A-N. Thus, when the master key 230 is used to initialize an AP key 250, the MKS is written into the AP key 250 as its NKR. The MKR is written into the AP key 250 as the NKS. In other words, MKS and MKR are flipped in the AP key 250. Moreover, when the master key is used to initialize a client key 240, the MKS is written into the client key 240 as NKS (not flipped) and the MKR is written as the NKR. When the AP key 250 and client keys 240A-N are used communicate, the AP's NKR key is identical to the client's NKS key and the AP's NKS key is identical to the client's NKR key. Thus, a matched pair of cryptographic keys exists between each pair of endpoints on a secure mode enabled Wi-Fi network. In an alternative embodiment of the invention, NKS and NKR of the client key 240 is flipped with respect to MKS and MKR, and NKS and NKR of the AP key 250 is not.

If the AP key 250 has been previously initialized, it is determined (step 645) whether the inserted AP key is associated with the current network 200 or another Wi-Fi network. If AP key 250 is associated with the current network 200 then the parameters of the key excluding any cryptography keys, which are maintained in secret, may be displayed (step 650). For security protection, an administrator can never view or modify any of the cryptographic keys in either the master key 230, client keys 240A-N, or AP key 250. If the inserted AP key is associated with another network, the appropriate parameters of the key may be displayed (step 655). In an embodiment of the invention, one AP key 250 may be associated with a plurality of different secure mode enabled Wi-Fi networks. For example, if the AP key 250 is determined to be associated with another network, the administrator is queried (step 660) as to whether it is desired to have the AP key 250 associated with the present network 200. If so, then the administrator is requested (step 625) to enter a correct PIN to unlock the AP key. Once unlocked, steps 630-640 are repeated for that AP key.

Figure 7:
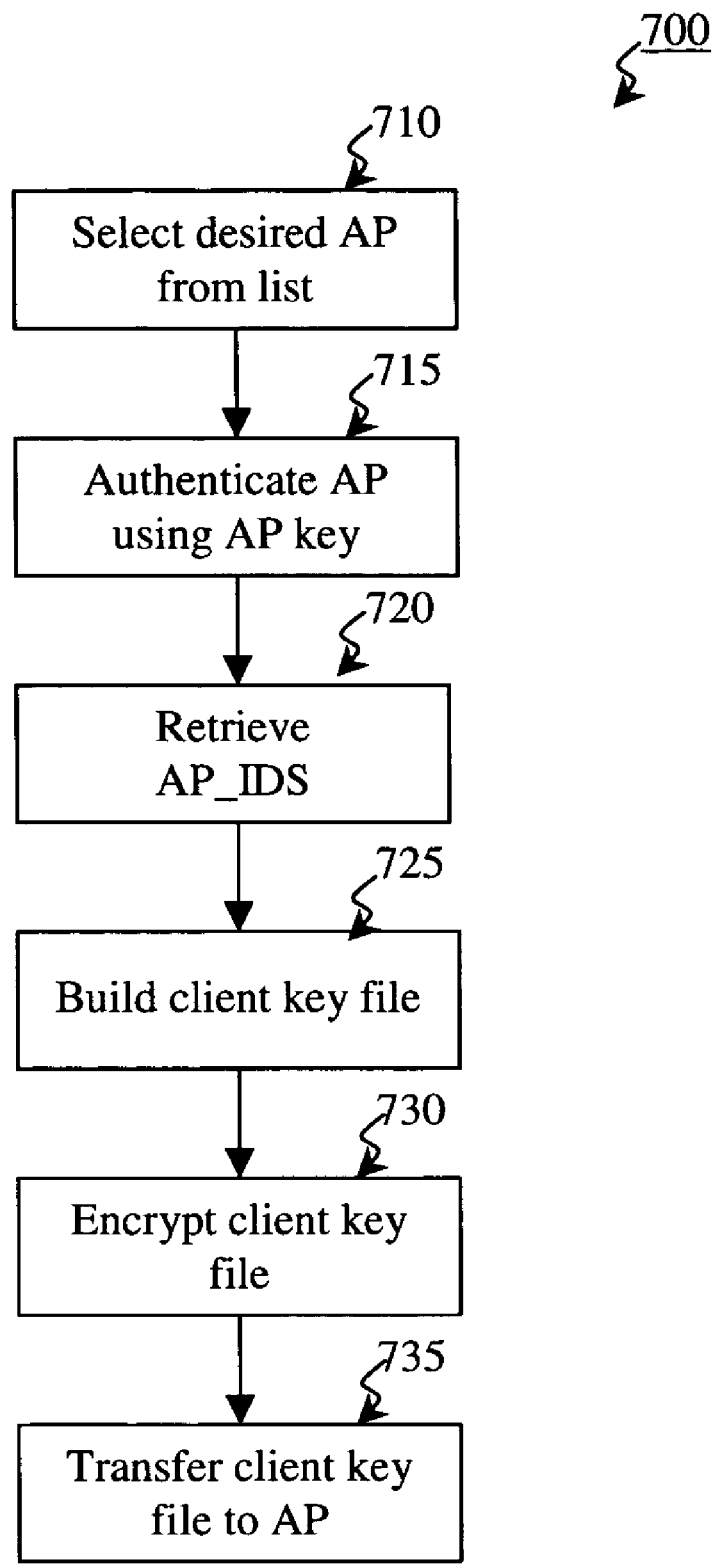
FIG. 7 illustrates a process for uploading a client key database file to an access point according to an embodiment of the invention.

FIG. 7 illustrates a process 700 implemented by the administrative software to upload a client key database file to an access point 220 according to an embodiment of the invention. Particularly, only information from the client records of key database 310 are uploaded to the access point 220. Process 700 requires that master key 230 is installed into host computer 210A and AP key 250 is installed into access point 220. Particularly, an administrator selects (step 710) via the administrative software an access point displayed from a list of all access points employed on the network 200. The selected access point, e.g., access point 220, is then authenticated (step 715) by implementing the authentication process described in the following paragraphs. Using the serial number of the access point 220, the AP_IDS is retrieved (step 720) from the key database 310. Importantly, the AP key 250 for that network has only one AP_IDS, which is stored in SIM 252 and also in the key database 310. A client key database file comprising the serial numbers and CK_IDS of all registered client keys 240A-N is built (step 725). No information pertaining to the AP key 250 is included in the client key database file, i.e., transferred between the access point 220 and the host computer 210A. The client key database file is encrypted (step 730) using AP_IDS stored within the key database 310 and then transferred (step 735) to the access point 220 where it is decrypted using the AP_IDS stored within SIM 252. In an embodiment of the invention, the access point 220 maintains the client key database file in non-volatile memory. As will be further described in greater detail, any time a client device 210 attempts to authenticate with the access point 220, the client device 210 presents the serial number corresponding to its client key 240. Using this client key serial number, the access point 220 retrieves the corresponding CK_IDS cryptographic key from the client key database file stored within the access point 220.

In an embodiment of the invention, each CK_IDS is encrypted in host computer 210A with AP_IDS prior to uploading to the access point 220. The client key database file within the access point 220 is a collection of client records. Each client record comprises the plain text serial number and the encrypted CK_IDS associated with the corresponding client key 240. To use the CK_IDS of the client key 240 when communicating with the client device 210, the access point 220 pulls the corresponding record and then decrypts the encrypted CK_IDS with AP_IDS.

A preferred embodiment of the invention places the serial number and secret cryptographic key of all authorized client keys in a client database that is uploaded to each access point. While this is the preferred embodiment applicable for most enterprise locations, some public access points cannot practically store a large client database, which may pertain to hundreds of thousands of users, each having a unique secret cryptographic key, who may access an individual access point. To address such a dilemma, the access point can be pre-configured with a smaller database of secret cryptographic keys based on for example, a modulus of the serial number. For instance, assume that there is a need to handle 100,000 potential customers, but the access point can only store the credentials for 5,000 customers, i.e., only 5,000 secret cryptographic keys can be pre-stored in the access point. In an embodiment of the invention, the secret cryptographic key for each client key is derived by taking a modulus-5000 operation of its serial number. Thus, each client key will have an associated secret cryptographic key selected out of the possible pool of 5,000 cryptographic keys. While it is entirely possible that more than one client using an access point can in fact be implementing the same secret cryptographic key, no two users may have the same combination of unique serial number and secret cryptographic key.

Figure 8:
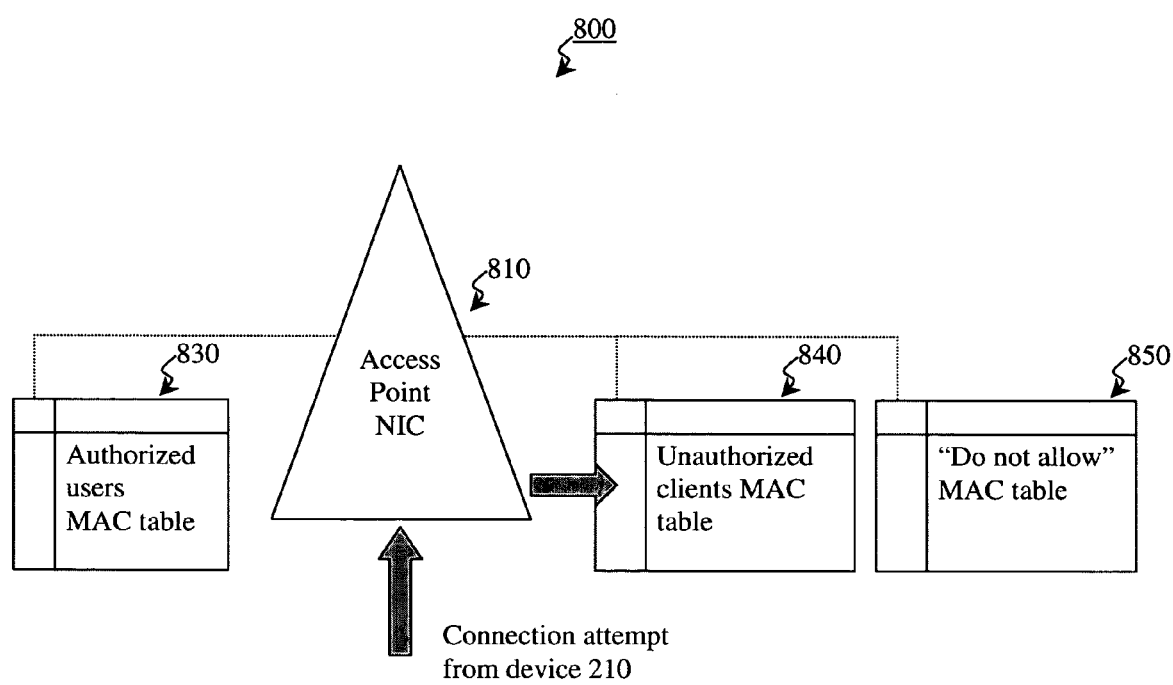
FIG. 8 illustrates a MAC address filtering system implemented at an access point according to an embodiment of the invention
Figure 9A:
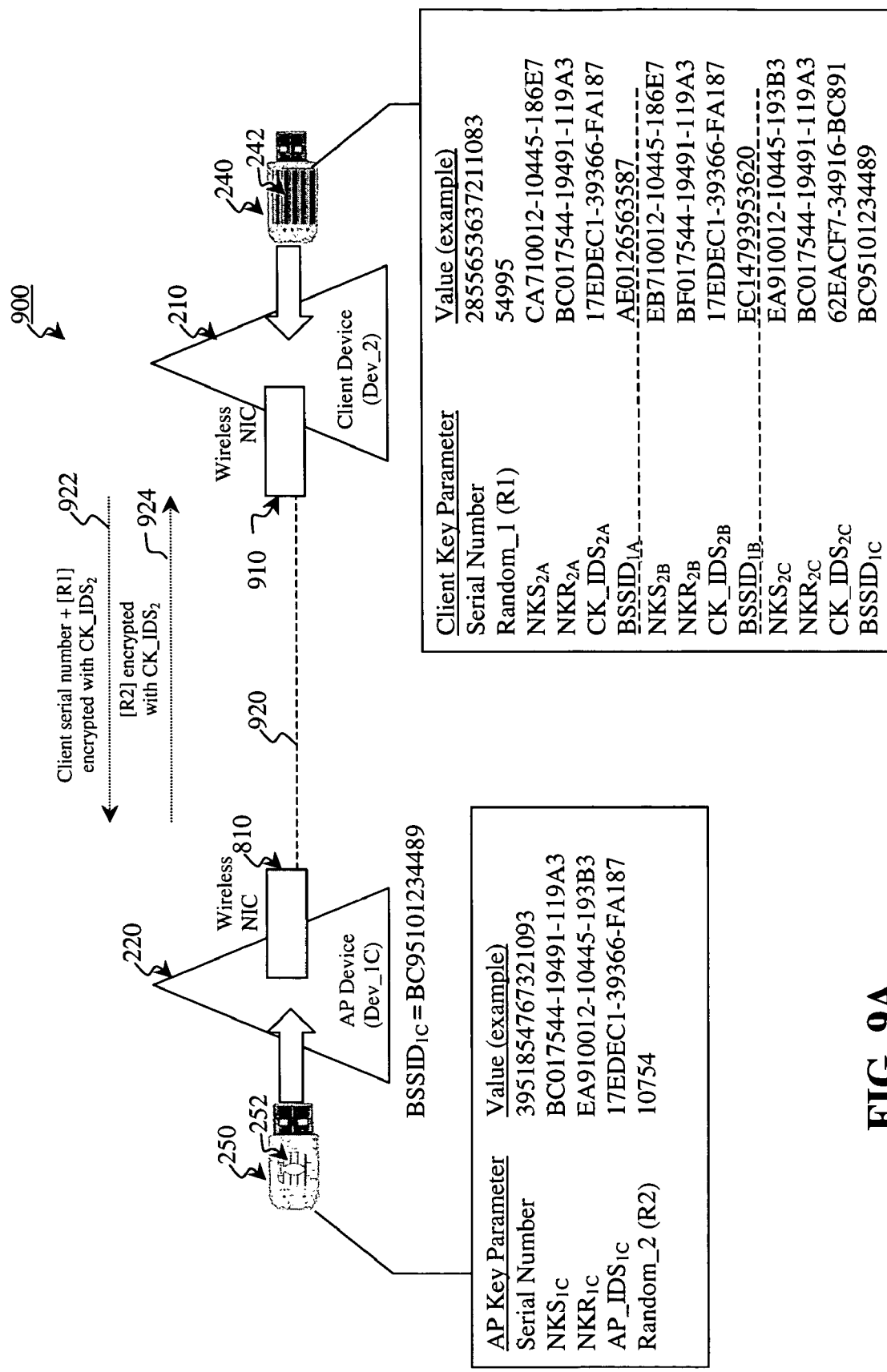
FIG. 9A illustrates exchange of authentication frames in a secure Wi-Fi network according to an embodiment of the invention.
Figure 10:
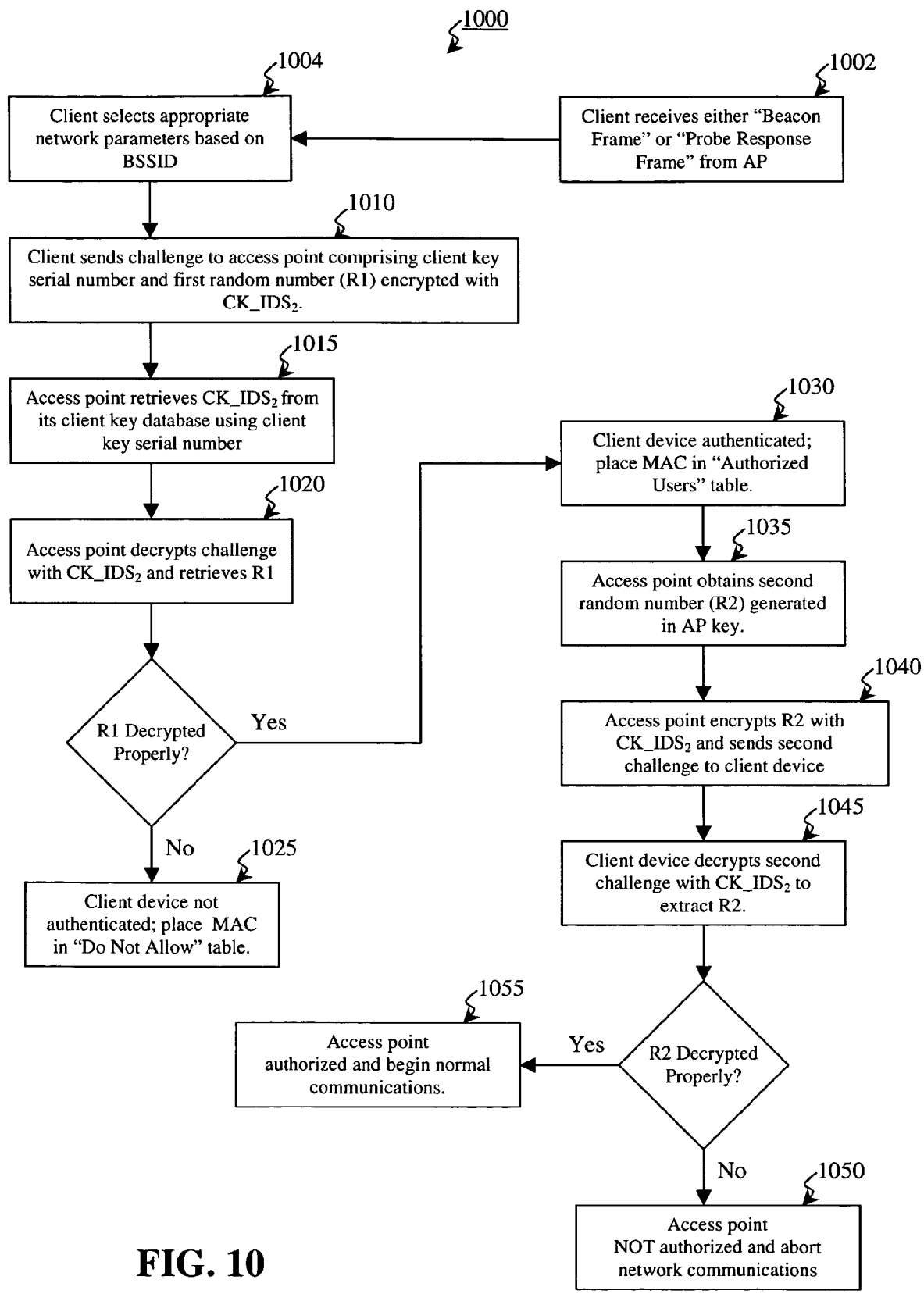
FIG. 10 illustrates a client device authentication process according to an embodiment of the invention.

The nerve center of the system is the AP software executing at access point 220. The AP software facilitates the authentication of a client computing device 210 attempting to access network 200. FIG. 8 illustrates a MAC address filtering system 800 implemented by the AP software at the access point 220 according to an embodiment of the invention. Particularly, authentication system 800 comprises a network interface card 810, an authorized clients MAC table 830, an unauthorized client table 840, and a "do not allow" table 850. NIC 810 facilitates communications between the access point 220 and the client devices 210A-N. The authorized clients MAC table 830 comprises the MAC address of all client devices 210, which are presently authorized to communicate on the network 200. The unauthorized client table 840 comprises the MAC address of all client devices 210 pending authentication. The "do not allow" table 850 comprises the MAC address of all devices that have failed authentication The client device authentication process is now described with reference to FIGS. 9-10. Particularly, FIG. 9A illustrates the exchange of authentication frames between the client device 210 with a properly configured client key 240 installed and the access point 220 with a properly configured AP key 250 installed during the second step of authentication. FIGS. 9B-C illustrate an exemplary format and contents of these authentication frames. FIG. 10 illustrates an authentication process 1000 implemented by the access point 220 and the client device 210.

Referring to FIG. 9A, the access point 220 and the client device 210 via respective NICs 810 and 910 communicate with each other on a Wi-Fi channel 920. During the implementation of the authentication process 1000, two authentication frames 922 and 924 are exchanged via Wi-Fi channel 920. In the exemplary embodiment illustrated, the client key 240 is initialized for, and hence authorized to use upon successful authentication, three secure mode enabled networks A, B, and C. For example, the client key 240 holds a unique set of the three parameters NKS, NKR, and CK_IDS for each secure mode enabled network to which it has permission. Optionally, a BSSID of a particular access point on each network A, B, or C is associated with each appropriate set of cryptographic parameters. For example, $BSSID_{1C}$ represents the BSSID of the access point 220 on network C. Similarly, $BSSID_{1A}$ and $BSSID_{1B}$ are associated with an access point on respective network A or B. The network send/receive cryptographic keys of each network are flipped between the access point 220 and the client device 210. In other words, the network send cryptographic key of the access point 220 is identical to the network receive cryptographic key of the client device 210, i.e., $NKR_{1C}=NKS_{2C}$ and $NKR_{2C}=NKS_{1C}$ for network C. The subscript designates the particular network A, B, or C, and which device the physical key resides in, e.g., "2" designates client device 210 and "1" designates access point 220. Example values of these parameters along with the serial numbers, random numbers, secret cryptographic keys $AP\_IDS_1$ and $CK\_IDS_{2A,B,\ or\ C}$, and $BSSID_{1A,B,\ or\ C}$ are presented in the figure to better illustrate the authentication process. It is important to note that NKR and NKS are private cryptographic keys stored in the physical keys 230, 240A-N, and 250. In an alternative embodiment of the invention, other types of cryptographic keys such as public/private cryptographic keys may be employed, the implementation of which is apparent to one of ordinary skill in the art.

The format of the authentication frames follow a standard 802.11 authentication framing format, the implementation of which is apparent to one of ordinary skill in the art. As depicted in FIGS. 9B-9C, each frame comprises an authentication algorithm number preferably set to an integer number undefined in the 802.11 specifications, e.g., "3", thereby designated that the authentication process 1000 is to be implemented. Moreover, each frame further comprises an authentication transaction sequence number that is incremented at each stage in the process; a status code that is set to "0" if the stage is successful; and a challenge text field ("challenge") that comprises the particular authentication parameters. Optionally, a cyclic redundancy check (CRC) can be appended to each message to insure the data integrity of each frame. Once in the secure mode, the access point 220 or the client device 210 will not accept an authentication frame designating an authentication algorithm number other than "3".

Referring to FIG. 10, upon entering the communication range of a wireless Wi-Fi network C comprising the access point 220 (Dev_1C), the client device 210 detects the presence of the network by either listening for a 'beacon" frame or a "probe response" frame (step 1002). The beacon or probe response frame comprises a BSSID field that uniquely identifies the network and access point, and distinguishes the current access point from other access points. For example, the beacon or probe response frame for the access point 220 on network C comprises $BSSID_{1C}$. In an embodiment of the invention, the client device 210 selects the appropriate network parameters based on the current BSSID, e.g., $BSSID_{1C}$, of the network (step 1004) received in the beacon or probe response frame. For example, The appropriate $NKS2_A$, $NKR2_A$ and $CK\_IDS2_A$ keys are selected which in the example shown are those of network #2.

Client device 210 sends (step 1010) the authentication frame 922 to the access point 220. The challenge of authentication frame 922 comprises the serial number of the client key 240 corresponding to the client device 210 attempting authentication and a first random number (R1) generated by SIM 242 of the client key 240. The challenge is encrypted with $CK\_IDS_{2C}$, which is stored within SIM 242 of the client key 240. Upon reception of authentication frame 922, the client key serial number allows the access point 220 to retrieve (step 1015) the secret cryptographic key $CK\_IDS_{2C}$ stored within the client key database file and associated with the client key 240 attempting authentication. The access point 220 then decrypts the challenge text with the $CK\_IDS_{2C}$ (step 1020) to obtain the random number R1 generated by the client key 240. If the decryption process yields a null (empty) string, the access point 220 knows the client device 210 is not a trusted device and therefore places (step 1025) the MAC Address of the client device 210 in the "Do Not Allow" table 850. If the decryption process does not yield a 'null' or empty string, then the access point 220 knows that the client device 210 is a trusted component and places (step 1030) the MAC address of the client device 210 in the "Authorized Users Table" 830.

One of the quirks of the decryption process is that the process returns either a decrypted string or a null string. A null string is a telltale indicator that the encrypted data could not be decrypted. Thus, if the decrypted result is not a null string, it can be safely assumed that the encryption key matches the decryption key.

The access point 220 forms an authentication response frame 924 featuring a second challenge comprising a second random number R2 generated (step 1035) by the SIM 252 of the AP key 250, which is encrypted (step 1040) with the same $CK\_IDS_{2C}$ associated with the client device 210. This second challenge within authentication frame 924 is sent to client device 210.

The client device 210 receives and decrypts (step 1045) the second challenge of authentication frame 924 using $CK\_IDS_{2C}$ stored with SIM 242 to obtain decrypted R2. If the decryption process yields an empty string, the client device 210 aborts (step 1050) further communications with the access point 220. If the decryption process does not yield a 'null' or empty string, then the client device 210 is assured (step 1055) that it is talking to a trusted component. In other words, a properly decrypted R2 indicates to the client device 210 that the access point 220 knows its secret key and therefore is a trusted component. Both sides now know R1 and R2 and therefore must know the appropriate CK_IDS.

Although not required, as an added safety measure, frames 922 and 924 are each encrypted with the common network cryptographic keys, e.g., frame 922 with the client's NKS key and frame 924 with the access point's NKS key. Decryption is performed at each end with the respective NKR key.

An alternative method to using the BSSID to determine the access point ID, and hence network ID, is easily understood by one of ordinary skill in the art. Particularly, the client device 210 implements a "brute force" process by selecting each set of the network parameters stored in the SIM token 242 sequentially to attempt authentication with the access point. For example, if the first set of network parameters are not successful in authenticating with the access point, the client device selects the next set of network parameters and continues the process until either a successful authentication takes place or the sets of network parameters are exhausted. In other words, based on the exemplary embodiment illustrated in FIG. 9A, the client device can first implement authentication process 1000 using the parameters of network A, e.g., $NKS_{2A}$, $NKR_{2A}$, and $CK\_IDS_{2A}$. If those don't result in a successful authentication, then the parameters of network B are used, and then the parameters of network C, etc. until a successful authentication results.

Figure 11:
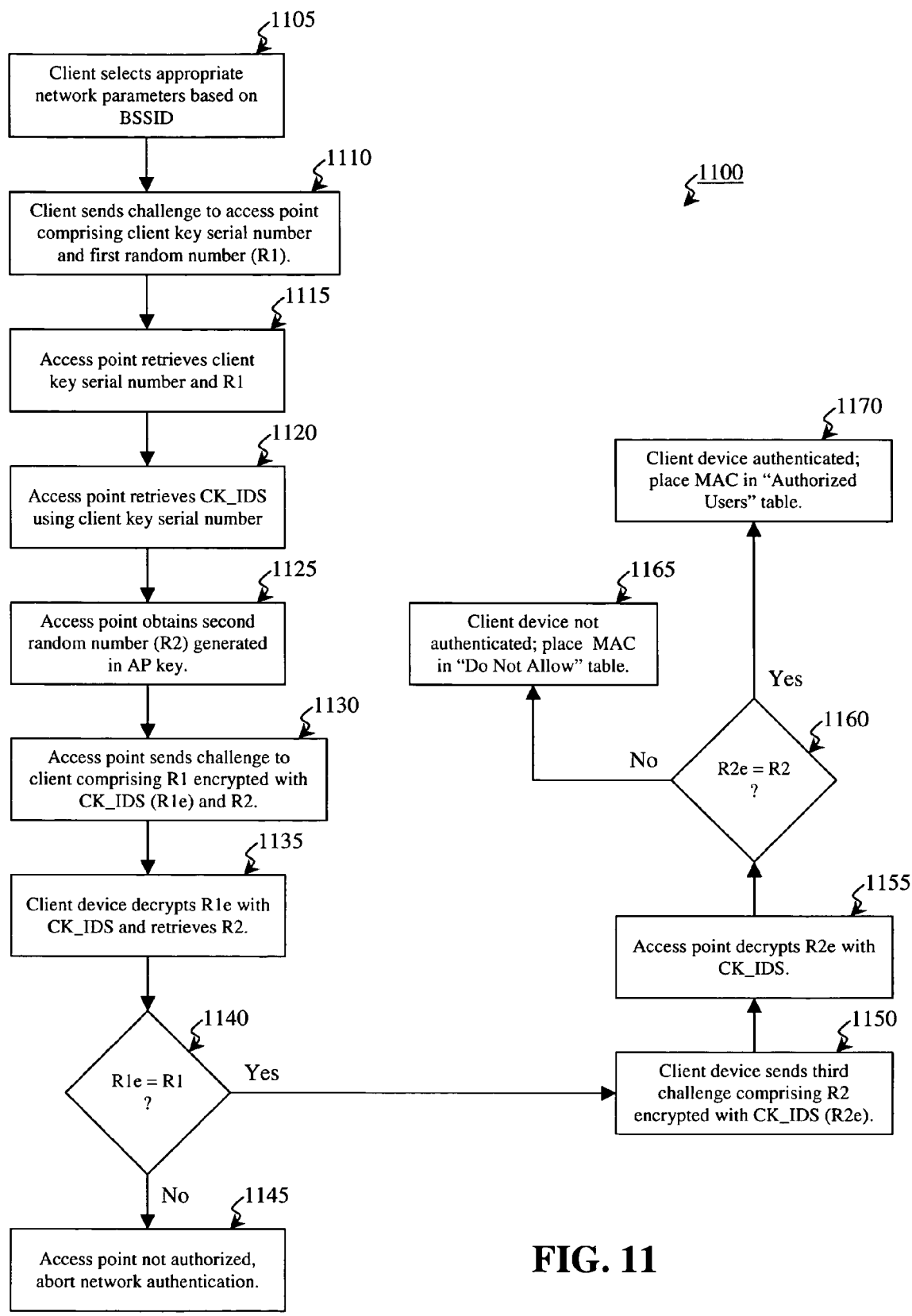
FIG. 11 illustrates a client device authentication process according to an alternative embodiment of the invention.

FIG. 11 illustrates an authentication process 1100 according to an alternative embodiment of the invention. Particularly, upon entering the communication range of a wireless Wi-Fi network, client device 210 selects (step 1105) one of a number of network parameter sets previously stored in the SIM token 242. Client device sends (step 1110) a first challenge to the access point 220. This challenge comprises the serial number of the client key 240 corresponding to the client device 210 attempting authentication and a first random number (R1) generated by SIM 242 of the client key 240. The challenge is encrypted with $NKS_2$, which is stored within SIM 242 of the client key 240. Upon reception of the first challenge, the access point 220 decrypts (step 1115) the challenge with $NKR_1$, which is stored within SIM 252 of the AP key 250 to extract the client key serial number and the first random number. The extracted client key serial number allows the access point 220 to retrieve (step 1120) the secret cryptographic key $CK\_IDS_{2C}$ stored within the client key database file and associated with the client key 240 attempting authentication. The access point 220 then obtains (step 1125) a second random number (R2) generated in the SIM 252 of the AP key 250. The first random number R1 is encrypted with $CK\_IDS_{2C}$ obtained from the client key database file. Encrypted R1 is not referred to as R1e. The access point forms a second challenge comprising R1e and R2. This second challenge is then encrypted with $NKS_1$ and sent (step 1130) to client device 210.

The client device 210 receives and decrypts the second challenge of authentication frame 924 using $NKR_1$ to obtain R1e and R2. R1e is then decrypted (step 1135) with $CK\_IDS_{2C}$ from SIM 242. The client device 210 then compares (step 1140) R1 as originally sent with the R1e received to identify if they match. If they don't match, the client device 210 aborts (step 1145) further communications with the access point 220. If a match is found, i.e., R1e equals R1, the client device 210 knows the access point 220 is a trusted component.

The client device 210 responds to the access point 220 with a final challenge. This challenge comprises the second random number R2 encrypted at the access point 220 with the $CK\_IDS_{2C}$. Encrypted R2 is now referred to as R2e. The client device 210 sends (step 1150) the third challenge encrypted with $NKS_2$ to the access point 220. The access point 220 decrypts (step 1155) the third challenge with $NKR_1$ and then R2e with $CK\_IDS_{2C}$. The access point 220 then compares (step 1160) R2 as originally sent with the decrypted R2e received to identify if they match. If the random numbers do not match, the access point 220 knows the client device 210 is not a trusted device and therefore places (step 1165) the MAC Address of the client device 210 in the "Do Not Allow" table 850. If R2e equals R2, the access point 220 knows that the client device 210 is a trusted component and places (step 1170) the MAC address of the client device 210 in the "Authorized Users Table" 830. In an alternative embodiment, if the authentication is not successful with a first set of network parameters, the client device can simply select the next set of network parameters as mentioned above, and repeat the process until the proper set of network parameters is found.

In a related embodiment, the random numbers R1 and R2 are first encrypted with $CK\_IDS_{2C}$ at the side of the connection where these numbers are generated. For example, the first challenge can comprise R1e instead of R1, which would then be returned in decrypted form to the client device 210 in the second challenge. Moreover, the second challenge can comprise R2e instead of R2, which would then be returned in decrypted form to the access point 220 in the third challenge. The selection of the side that first encrypts these random numbers with $CK\_IDS_{2C}$ is not important as long as a comparison is enabled between the random number as originally sent and the corresponding random number received in the subsequent challenge. Thus, enabling each side to determine whether the other side of the connection is employing an identical CK_IDS, and is therefore a trusted component.

Subsequent secure secret communications are implemented by a two-step encryption/decryption process according to an embodiment of the invention. First, there is the secret cryptographic key, e.g., MK_IDS, CK_IDS, or AP_IDS, stored in each of the master key 230, the client keys 230A-N, and the AP key 250. Each secret cryptographic key is initially generated randomly from and stored in the respective SIM token within the corresponding physical key. These secret cryptographic keys are never used directly to encrypt/decrypt communications, but are used as a starting point for a transposition process, which is described below, based on the two random numbers R1 and R2 generated during the authentication process.

In an embodiment of the invention, each secret cryptographic key is a 256-bit cryptographic key. Each of the bits are transposed according to a process using the first random number as the starting point and the second random number as the "skip" counter for stepping ahead to the next bit position to be transposed. The process results in a unique transposition of an original key that can be replicated exactly on each side of the communications link without any cryptographic key actually being transmitted. Since the access point 220 knows the secret cryptographic keys of each of the potentially connecting users, e.g., client devices 210A-N, the secret cryptographic key of the authenticated client device 210 can be used in conjunction with the two 'just-now-generated' random numbers to derive a 'new, one-time' cryptographic key for encrypting/decrypting data. Note that during the authentication process, the client key serial number is used as the identifier for the access point to obtain the client's secret cryptographic key, i.e., CK_IDS, from the client key database file. As there is no mathematical relationship between client key serial number and the CK_IDS, it is impossible to derive a calculated method of obtaining this secret cryptographic key.

Other embodiments and uses of the invention will be apparent to those skilled in the art from consideration of the specification and practice of the invention disclosed herein. Although the invention has been particularly shown and described with reference to several preferred embodiments thereof, it will be understood by those skilled in the art that various changes in form and details may be made therein without departing from the spirit and scope of the invention as defined in the appended claims.

I claim:

1. A method of authenticating a client to one or more computing devices at an edge of one or more communications networks, the method comprising the steps of:
    obtaining, by the client, a computing device identifier associated with a computing device;
    selecting, at said client, a set of authentication parameters associated with said computing device identifier, said authentication parameters being stored in a tamper-resistant physical token operatively coupled to said client, said tamper-resistant physical token further permanently storing a unique identifier associated with said client, said tamper resistant physical token further storing a first cryptographic key; and
    implementing an authentication process employing said set of authentication parameters, the authentication process comprising the steps of:
        transmitting, by the client to the computing device, a first challenge, wherein said first challenge comprises an encrypted first random number and said unique identifier associated with said client, said first random number being generated inside said tamper-resistant physical token, said encrypted first random number being encrypted with said first cryptographic key;
        receiving, by the client from the computing device, a second challenge, wherein said second challenge comprises an encrypted second random number, said second random number generated at said computing device and encrypted with a second cryptographic key, said second cryptographic key being obtained by said computing device and associated with said computing device identifier; and
        permitting, at said client, said client to access said communications network via said computing device if said authentication process results in a successful authentication of said client.

2. The method of claim 1, wherein said computing device identifier is a basic service set identifier (BSSID).

3. The method of claim 1, further comprising the step of installing said tamper-resistant physical token at said client.

4. The method of claim 3, wherein said tamper-resistant physical token is adapted to be inserted into a communications port at said client.

5. The method of claim 1, wherein said tamper-resistant physical token further comprises one or more additional sets of authentication parameters, wherein each of the one or more additional sets of authentication parameters is associated with a unique computing device identifier.

6. The method of claim 5, wherein each of said unique computing device identifier is stored in said tamper-resistant physical token and in relation to an associated set of authentication parameters.

7. The method of claim 1, wherein said unique identifier is a serial number of said tamper-resistant physical token.

8. The method of claim 1, wherein said set of authentication parameters further comprises:
    a network receive cryptographic key, and
    a network send cryptographic key.

9. The method of claim 8, further comprising the steps of:
    encrypting, by the client, said first challenge with said network send cryptographic key; and
    decrypting, by the client, said second challenge with said network receive cryptographic key.

10. A system for authenticating a client to one or more computing devices at an edge of one or more communications networks, the system comprising:
    one or more computing devices,
    a client, wherein the client is operatively coupled to a unique tamper-resistant physical token, the tamper-resistant physical token comprising:
        one or more unique sets of authentication parameters, wherein each set of authentication parameters is associated with one or more of said one or more computing devices;
        a first cryptographic key, wherein said first cryptographic key is permanently stored in said tamper-resistant physical token;
        a random number generator; and
        a unique identifier, wherein said unique identifier is permanently stored in said tamper-resistant physical token; and
    software installed in said client configured to cause said client to:
        obtain a unique identifier of one of said one or more computing devices;
        select a set of authentication parameters from said one or more unique sets of authentication parameters associated with the one of said one or more computing devices;
        transmit, by the client to the one of said one or more computing devices, a first challenge, wherein the first challenge comprises an encrypted first random number and said unique identifier, wherein the first random number is generated by said random number generator within said unique tamper-resistant physical token, wherein said encrypted first random number is encrypted using the first cryptographic key;

receive, by the client from the one of said one or more computing devices, a second challenge, wherein the second challenge comprises an encrypted second random number, said second random number generated at the one of said one or more computing devices and encrypted using a second cryptographic key, said second cryptographic key being obtained by the one of said one or more computing devices and associated with the one of said one or more computing devices; and permit, at said client, said client to access said communications network via the one of said one or more computing devices if the one of said one or more computing devices successfully responds to the first challenge and the client successfully responds to the second challenge.

11. The system of claim 10, wherein each client device further includes a wireless communications transceiver to communicate with one of said one or more computing devices via a wireless channel.

12. The system of claim 11, wherein said wireless channel is in the range of 2.4 GHz and 5 GHz.

13. The system of claim 10, wherein one or more computing devices are Wi-Fi access points.

14. The system of claim 13, wherein at least two Wi-Fi access points are associated with different Wi-Fi networks.

15. The system of claim 14, wherein each of said one or more unique sets of authentication parameters is associated with an access point identifier.

16. The system of claim 15, wherein said access point identifier is a basic service set identifier (BSSID).

17. The system of claim 10, wherein each tamper-resistant physical token is adapted to be installed via a communications port at said client.

* * * * *

UNITED STATES PATENT AND TRADEMARK OFFICE
CERTIFICATE OF CORRECTION

PATENT NO. : 7,607,015 B2
APPLICATION NO. : 10/679268
DATED : October 20, 2009
INVENTOR(S) : Anthony C. Fascenda It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 996 days.

Signed and Sealed this

Twelfth Day of October, 2010

David J. Kappos
*Director of the United States Patent and Trademark Office*